Nov. 20, 1951 — F. A. REIP — 2,575,361
GAUGE ROD WIPER
Filed Dec. 17, 1947
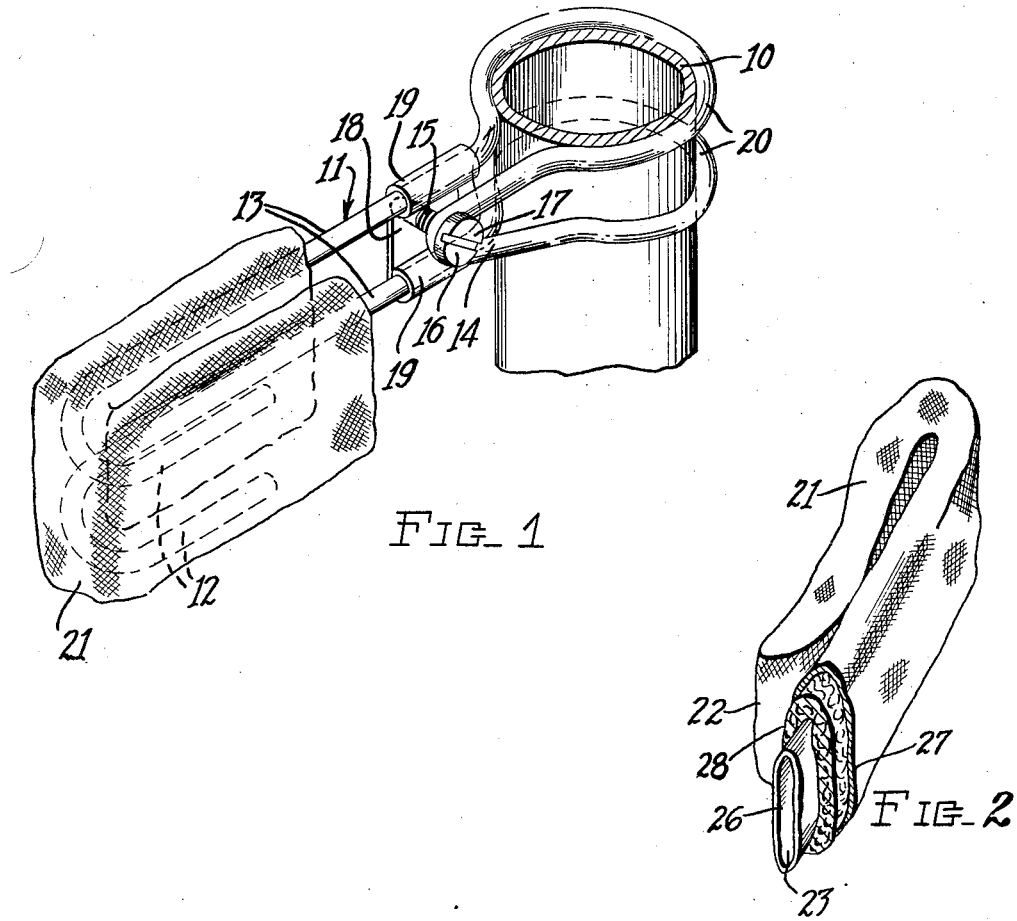
INVENTOR.
FRANK A. REIP
BY John J Lynch
ATTORNEY Patented Nov. 20, 1951

2,575,361

UNITED STATES PATENT OFFICE 2,575,361

GAUGE ROD WIPER

Frank A. Reip, Brooklyn, N. Y.

Application December 17, 1947, Serial No. 792,213

4 Claims. (Cl. 15—210)

This invention relates to wipers for oil gauge rods and in particular to one that can be mounted on a pipe or other device adjacent the engine of an automotive vehicle so that the rod, after use in gauging the oil, can be quickly and conveniently wiped clean.

A particular object of the invention is to provide a holder for a wiping element so constructed that it can be fitted to pipes or other support means of various size without the need of using adjustable parts that render the construction complicated and cumbersome.

A further object of the invention is to provide a pad structure and holder combination wherein the pad can be reversed on the holder for use of the opposite sides thereof as a wiping element so that maximum advantage may be taken of the wiping and drying facilities of the implement.

A still further object of the invention is to provide a gauge rod wiper having a malleable end for receiving and holding the wiping pad which can be opened to receive a pad and bent to closed position to retain the pad so that the latter can be reversed for use by the simple expedient of opening up the ends thereof and remounting the pad and then folding the ends to closed position.

Still further objects of the invention provide for the use of a sliding nut structure that is particularly adapted for use with the wire structure of the wiper frame so that the latter can be adjusted automatically to the support pipe and secured thereto without manipulation on the part of the one installing the wiper.

With these and other objects in view, the invention comprises certain constructions hereinafter described and then particularly pointed out in the claims and a preferred embodiment of my invention is illustrated in the accompanying drawing, in which:

Figure 1 is a view in perspective of a gauge rod wiping device constructed in accordance with my invention and mounted for use on a support pipe or the like.

Figure 2 is a view in perspective of a form of pad used with the holder, the end of the pad being shown in section to illustrate the structure thereof and means for mounting the same on the wire frame of the holder, Figure 3 is an enlarged detail in section taken beneath the head of the screw to show how the end of the wire frame is connected thereto, and Figure 4 is a view similar to Figure 5 showing the looped end of the wire frame in association with the screw shank.

This application is a continuation-in-part of application Serial Number 565,231, filed November 27, 1944, for Gauge Rod Wiper (now abandoned).

Referring to the drawing in detail, 10 indicates an oil filler pipe as usually found in automobiles adjacent the engine and to which my novel gauge rod wiper may be detachably secured to facilitate the wiping of a gauge rod, not shown, that is covered with oil from a gauging operation. The wiper comprises a single piece wire frame 11 having free ends 12 bendable at the terminal ends of parallel arm portions 13 which are looped as at 14 at the closed end to fit about the shank 15 of an adjusting screw 16. The latter is provided with a flat head 17 and a threaded end for adjustable engagement with a sliding adjustment or tightener plate 18, the edges of which are formed as at 19 to provide tubular guides through which the arm portions 13 have sliding fit. The plate 18 maintains the arms in parallel relation so that the pad 21 carried thereby is held in proper position with respect to said arms. The wire frame is flexibly malleable so that the ends thereof may be opened or closed in folding movement to secure the pad in place or permit removal thereof from the frame either for renewal or reversal. This condition of the wire frame permits it to be placed about pipes of various size or other support means of irregular shape so that when the nut is adjusted the encircling portion 20 of the frame may tightly embrace the support or pipe to securely hold the wiper in position for use. The encircling action is caused by the action of the plate and screw in pulling the looped end of the frame toward the slide plate to decrease the diameter of the loop and cause the frame to grip the pipe.

As shown in Figures 3 and 4, the loop end of the frame where it engages the screw, may be shaped to provide an eye end or may be reversely looped about the shank of the screw.

The pad 21 has one end closed as at 22 and the opposite end open as at 23 so that it can be slipped over the ends of the wire frame. The pad may consist, for instance, of an inner paper liner 26 to provide a smooth internal cavity that will not interfere with the ready positioning of the pad on the frame, an outer fabric covering 27 and an intermediate pad 28 of felt or other suitable absorbent material. The closed end may be sewn shut as the pad may be first manufactured in tubular form and then cut into the desired lengths for use on the holder.

It is evident therefor that I have provided a handy oil gauge cleaner which is easily attached to a convenient support, can be readily reversed for double life use, and makes the purchase of a complete new holder unnecessary when replacement of the pad is indicated. Further, the construction involving a minimum number of parts eliminates the possibility of rattling and the device may be mounted on any support adjacent the engine so that the pad will be quickly dried out after use.

My invention is not to be restricted to the precise details of construction shown since various changes and alterations therein may be made without departing from the scope of the invention or sacrificing the advantages to be derived from its use.

What I claim is:

1. A gauge rod wiper comprising a wire frame formed to provide a clamp loop at one end, and extended pad supporting arms reversely bent at the free ends thereof, an absorbent pad supported on said bent ends and on the arms opposite said bent ends to provide opposed wiping faces of the pad for cleaning an article passed therebetween, a plate slidable on said arms and a screw on the plate having a head engaging said loop for adjustably clamping the loop end of the frame about a supporting structure.

2. A gauge rod wiper comprising a wire frame formed to provide a closed end and having extended pad supporting arms reversely bent at the free ends thereof, a wiping pad on said bent ends and on the arms opposite the bent ends of said frame to provide opposed wiping faces for cleaning an article passed therebetween, a clamp plate slidably mounted on the arms of said frame and a screw having a shank portion threaded into said plate and with which the closed end of the frame engages, and head means on the screw for engaging said closed end of the frame to draw the latter in clamping position about a support.

3. A gauge rod wiper comprising a wire frame formed to provide a closed end and free ends, and arranged to have the closed end thereof bent about a support and the free ends reversely bent, means for drawing said closed end about the support including slide means on the frame and means for connecting said slide means and the closed end of said frame in relatively adjustable relation, and a wiping pad on the reversely bent free ends of said frame and on the frame portion opposite said bent ends to provide opposing faces for wiping an article passed therebetween.

4. A gauge rod wiper comprising a holding frame having one end looped for engagement about a support, a body extending from said loop and presenting reversely bent free ends, a pad removably mounted on said free ends and on the portion of the frame opposite said bent ends to present opposed faces for wiping an article passed therebetween, a slide on said frame and bolt means connecting the slide and the looped end of the frame for adjusting said looped end with respect to said body to open and close said loop, in clamping action, about a supporting member.

FRANK A. REIP.

REFERENCES CITED

The following references are of record in the file of this patent:

UNITED STATES PATENTS

| Number | Name | Date |
|---|---|---|
| 1,114,163 | Mansfield | Oct. 20, 1914 |
| 1,759,788 | Holveck | May 20, 1930 |
| 1,770,300 | Davis | July 8, 1930 |
| 1,871,208 | Bouchard | Aug. 9, 1932 |
| 1,973,093 | Moore | Sept. 11, 1934 |
| 1,992,423 | Hale | Feb. 26, 1935 |
| 2,483,536 | Gamble et al. | Oct. 4, 1949 |